(12) United States Patent
Chow et al.

(10) Patent No.: US 7,247,997 B2
(45) Date of Patent: Jul. 24, 2007

(54) ELECTROLUMINESCENT LAMP DRIVING CIRCUIT AND METHOD

(76) Inventors: Shing Cheung Chow, 1C/D, Young Ya Industrial Building, 381-389 Sha Tsui Road, Tsuen Wan, N.T. (HK); Lap Lee Chow, 1C/D, Young Ya Industrial Building, 381-389 Sha Tsui Road, Tsuen Wan, N.T. (HK); Lap Hang Chow, 1C/D, Young Ya Industrial Building, 381-389 Sha Tsui Road, Tsuen Wan, N.T. (HK)

( * ) Notice: Subject to any disclaimer, the term of this patent is extended or adjusted under 35 U.S.C. 154(b) by 76 days.

(21) Appl. No.: 11/114,882

(22) Filed: Apr. 26, 2005

(65) Prior Publication Data
US 2006/0238140 A1    Oct. 26, 2006

(51) Int. Cl.
*H05B 41/16* (2006.01)
*H05B 37/02* (2006.01)

(52) U.S. Cl. ...................... 315/287; 315/291

(58) Field of Classification Search ............. 315/246, 315/276, 283, 287, 291, 307, 224, 225
See application file for complete search history.

(56) References Cited

U.S. PATENT DOCUMENTS 6,515,427 B2 * 2/2003 Oura et al. ............... 315/141
2005/0218827 A1 * 10/2005 Ushijima et al. ........... 315/224

* cited by examiner

*Primary Examiner*—Thuy Vinh Tran
(74) *Attorney, Agent, or Firm*—Osterolenk, Faber, Gerb & Soffen, LLP

(57) ABSTRACT

A driving circuit for driving an electroluminescent lamp is disclosed. The driving circuit includes an alternating current (AC) voltage generator for providing at an output an AC output voltage waveform for driving an electroluminescent lamp and a controller for controlling the phase and polarity of the AC output voltage waveform. The controller is operable to reverse the phase and polarity of the AC output voltage. In one embodiment, the AC voltage generator includes a transformer.

12 Claims, 9 Drawing Sheets

ELECTROLUMINESCENT LAMP DRIVING CIRCUIT AND METHOD

FIELD OF THE INVENTION

The present invention relates to a driving circuit for an electroluminescent lamp. In a typical application, the present invention may be used to drive an electroluminescent lamp of the type commonly referred to as a cold cathode fluorescent lamp (CCFL).

BACKGROUND TO THE INVENTION

Electroluminescent lamps, such as CCFLs, are used in a variety of applications, including illuminating liquid crystal displays, scanners, photocopiers and the like. The lamps themselves are small, relatively efficient and inexpensive. However, they must be driven by specialised driving circuits that are capable of providing an output voltage that is sufficiently high to ignite the lamp and sustain illumination of the lamp after ignition.

A block diagram for a conventional driving circuit 100 that is commonly used to drive a CCFL type electroluminescent lamp is depicted in FIG. 1. This driving circuit 100 includes an alternative current (AC) voltage source 102 and a transformer 104. The driving circuit 100 is shown here as connected to a CCFL 108 load.

In conventional driving circuits of the type illustrated in FIG. 1, the transformer 104 is typically connected to the AC voltage source 102 using a conventional push-pull type topology. In operation, the AC voltage source 102 alternately produces an input current in the primary windings 110, 112 of the transformer 104 so as to thereby generate an AC output voltage waveform 114 (in the form of a high voltage AC output waveform) at an output 116 of the driving circuit 100 for driving the electroluminescent lamp. As is illustrated, the generated. AC output voltage waveform 114 includes a positive half cycle 118 and a negative half cycle 120.

In conventional driving circuits of the type illustrated in FIG. 1, the direction of the winding current in each of the primary windings 110, 112 has a fixed direction. That is, the current alternately flows either from point A to points B and C, or otherwise, it alternately flows from points B and C to point A. Thus, the direction of these currents does not change during operation. Likewise, the relationship of the polarity and phase of the AC output voltage waveform to the primary windings will also not change; the positive half cycle will always be attributable to one of the primary windings, the negative half cycle will always be attributable to the other primary winding.

Although conventional driving circuits of the type shown in FIG. 1 operate satisfactorily, long term use may lead to a reduction in the usable life of the CCFL. Such a reduction tends to result as a consequence of the positive half cycle 118 and a negative half cycle 120 of the output voltage waveform 114 having a fixed relationship with the primary windings 110, 112. More specifically, and as a result of the above-described fixed relationship, if characteristics of the components used to supply the input voltage to the primary windings drift over time (or are not carefully matched), or indeed if the characteristics of the primary windings change, distortion of the output voltage waveform occurs. Such distortion typically results in an asymmetric AC output voltage waveform in which the peak magnitude of one half cycle is different (that is, greater or less than) to the peak magnitude of the other half cycle.

Asymmetry in the AC output voltage waveform tends to cause an uneven distribution of Mercury (Hg) within the CCFL in that the density of Hg at the end of the CCFL connected to the primary winding supplying the half cycle having the larger magnitude voltage will decrease over time. In a serious case, this will lead to blackening at one end of the CCFL tube and will adversely affect the performance of the devices using the CCFL (for example liquid crystal display, scanner, photocopier), even to the extent that such devices become unusable.

In view of the foregoing, it would be desirable to provide a driving circuit that solved the above-mentioned problems.

SUMMARY OF THE INVENTION

The present invention is directed to a driving circuit for an electroluminescent lamp. In general terms, the driving circuit of the present invention provides an AC output voltage waveform having a polarity, and thus phase, that is controllably reversible. Thus, according to a first aspect of the present invention, there is provided a driving circuit for driving an electroluminescent lamp, the driving circuit including:

an alternating current (AC) voltage generator for providing at an output an AC output voltage waveform for driving the electroluminescent lamp; and a controller for controlling the phase and polarity of the AC output voltage waveform;

wherein the controller is operable to reverse the phase and polarity of the AC output voltage waveform.

Reversal of the polarity and the phase of the AC output voltage waveform by the controller may occur during an ignition phase of the electroluminescent lamp, that is when the CCFL is switched on. Alternatively, reversal of the polarity and the phase of the AC output voltage waveform by the controller may occur during operation of the electroluminescent lamp after the ignition phase, in which case the reversal may be controlled so as to occur periodically, perhaps at regular time intervals. In either case, the AC output voltage waveform will have a different polarity, and thus phase, after reversal has occurred.

According to another aspect of the present invention, there is provided a driving circuit for driving an electroluminescent lamp, including:

an alternating current (AC) voltage generator for providing at an output of the driving circuit an AC output voltage waveform for driving the electroluminescent lamp; and a controller controlling the phase and polarity of the AC output voltage waveform, the controller having two modes of operation such that in a first mode of operation the phase and polarity of the AC output voltage waveform is reversed relative to the phase and polarity of the AC output voltage waveform in a second mode of operation.

Any suitable AC voltage generator may be used. One suitable AC voltage generator may include a transformer, such as a magnetic transformer or a ceramic piezoelectric transformer. In an embodiment that includes a magnetic transformer, the transformer may include a first and second primary windings and a secondary winding. In such an embodiment, the AC output voltage waveform may include positive half cycles and negative half cycles having a relationship with the primary windings of the transformer so as to be attributable to energisation thereof by an input voltage source so that in the first mode of operation the positive and the negative half cycles are attributable to energisation of the first and the second primary winding respectively, and in the second mode of operation the positive and the negative half cycles are attributable to the energisation of the second and the first primary winding respectively.

In a preferred form, the first and second primary windings are dual windings of a centre tapped primary winding.

In an embodiment, the AC output voltage waveform may be produced by a secondary winding of the magnetic transformer that has been energised by energisation of either the first or second primary windings. Thus, in one embodiment, the positive half cycles of the AC output voltage waveform are produced by energisation of either the first or second primary windings, whereas the negative half cycles are produced by energisation of the other primary winding.

The controller may be located in a "primary side circuit" or a "secondary side circuit". In this respect, reference to the term "primary side circuit" throughout this specification is to be understood to be reference to a circuit that includes either of the primary windings, whereas reference to the term "secondary side circuit" is to be understood to be reference to a circuit that includes the secondary winding.

In relation to an embodiment that includes a magnetic transformer, and in an embodiment where the controller is located in a primary side circuit, the controller may be configured to select different conducting paths between an input voltage source and the primary windings of the transformer. In this form, the transformer may be a component of a push-pull type inverter that is configured to alternately supply the input voltage source to the primary windings via a selected conducting path. The push-pull type inverter may have any suitable topology. One suitable topology may include a Royer type inverter.

In an embodiment, the selectable conducting paths include first and second conducting paths. In this embodiment, the first conducting path may include controllable switches for allowing current to pass through the first and second primary windings alternately in respective directions so that a voltage waveform across the first primary winding has an opposite polarity and phase relative to a voltage waveform across the second primary winding. The second conducting path may include controllable switches for allowing current to pass through the first and second primary windings alternately in respective directions that are reverse to the directions provided by the first conducting path. In this embodiment, the reversal in the direction of current in the primary windings results in the polarity, and thus the phase, of the AC output voltage waveform also being reversed. A reversal of this type modifies the relationship between the primary windings and the half cycles of the output voltage waveform.

In an embodiment including a transformer, and where the controller is located in a secondary side circuit, the controller may be operable to reverse the polarity of the AC output voltage waveform relative to a voltage waveform across the secondary winding. According to this embodiment, in the first mode of operation the AC output voltage waveform has substantially the same polarity and phase as the voltage waveform across the secondary winding and in the second mode of operation the AC output voltage waveform has substantially a reversed polarity and phase relative to the voltage waveform across the secondary winding. Thus, in such an arrangement, the controller is operable to reverse the polarity, and thus the phase, of the AC output voltage waveform relative to the voltage waveform across the secondary winding. Thus, in this embodiment, the modification of the relationship between the primary windings and the half cycles of the AC output voltage waveform includes modifying the relationship between the polarity and phase of voltage waveform across the secondary winding and the polarity and phase of the resultant AC voltage waveform provided to the lamp.

Irrespective of whether the controller is located in a primary side circuit or a secondary side circuit, the controller may be constructed to switch periodically between the first mode and the second mode of operation so that mode switching occurs intervally. In one embodiment, the interval between mode switching is fixed so that the mode switching occurs at regular intervals. In another embodiment, the interval between mode switching is controllably variable so that the mode switching occurs at controllable intervals.

In view of the above, and according to yet another aspect of the present invention, there is provided a driving circuit for driving a cold cathode fluorescent lamp, including:

an input for coupling to an input voltage source;

an alternating current (AC) voltage generator including a transformer having first and second primary windings and a secondary winding, the transformer producing, at an output of the driving circuit, an AC output voltage waveform including positive half cycles and negative half cycles, the positive half cycles and negative half cycles having a relationship with the primary windings of the transformer so as to be attributable to energisation thereof by the input voltage source;

a controller controlling the relationship between the primary windings and the half cycles of the AC output voltage waveform so that in a first mode of operation the positive and the negative half cycles are attributable to energisation of the first and the second primary winding respectively, and in a second mode of operation the positive and the negative half cycles are attributable to the energisation of the second and the first primary winding respectively so that in the first mode of operation the phase and polarity of the AC output voltage waveform is reversed relative to the phase and polarity of the AC output voltage waveform in the second mode of operation.

Finally, according to another aspect of the present invention there is provided a lighting system, including:

a driving circuit for driving an electroluminescent lamp, including:

an alternating current (AC) voltage generator for providing at an output an AC output voltage waveform for driving an electroluminescent lamp; and a controller for controlling the phase and polarity of the AC output voltage waveform; and an electroluminescent lamp coupled to the output of the driving circuit. wherein the controller is operable to reverse the phase and polarity of the AC output voltage waveform.

In relation to applications of embodiments of the invention for driving CCFL type electroluminescent lamps, it is expected that the present invention will prevent, or at least delay the onset of, the uneven distribution of Hg within the CCFL, and thus alleviate the problem of blackening at one end of the CCFL after repeated starting.

BRIEF DESCRIPTION OF THE DRAWINGS

The invention will now be described in further detail by reference to the attached drawings illustrating examples forms of the invention. It is to be understood that the particularity of the drawings does not supersede the generality of the preceding description of the invention. In the drawings.

DETAILED DESCRIPTION OF A PREFERRED EMBODIMENT

Figure 1:
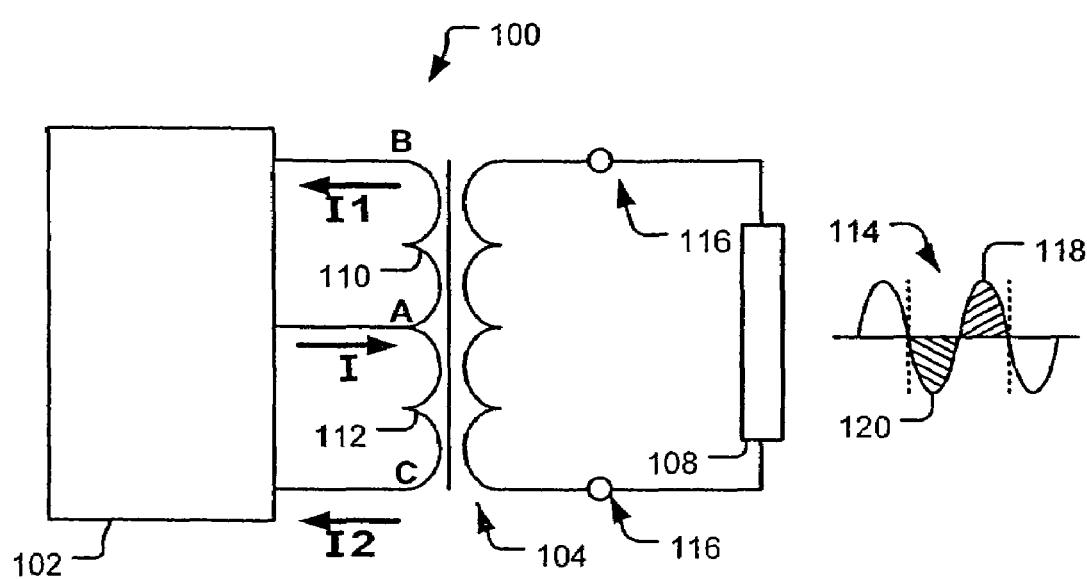
FIG. 1 is a simplified block diagram showing the operation of a conventional driving circuit for an electroluminescent lamp.
Figure 2:
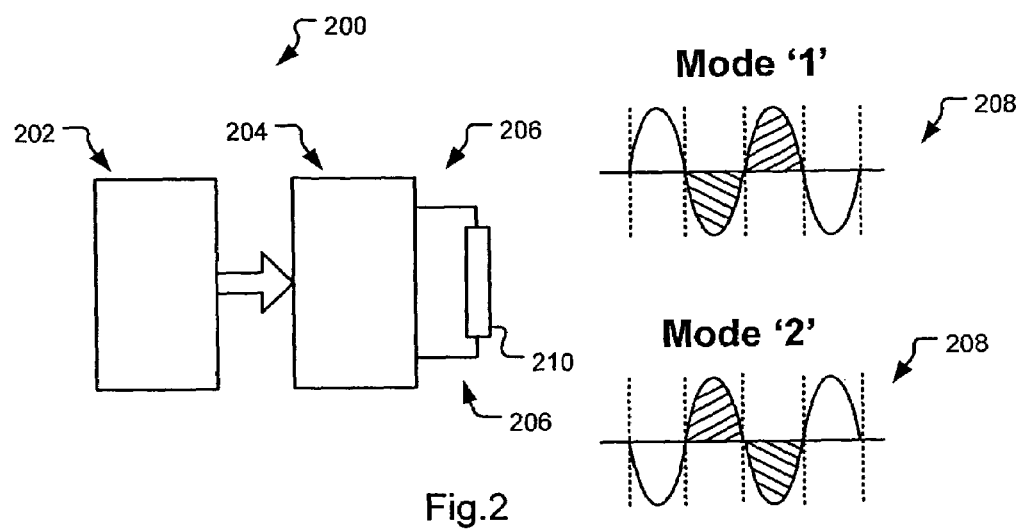
FIG. 2 is a simplified block diagram of a driving circuit according to an embodiment of the present invention.

FIG. 2 shows a simplified block diagram of a driving circuit 200 according to an embodiment of the present invention. The driving circuit 200 includes an alternating current (AC) voltage generator 204 and a controller 202. The AC voltage generator 204 provides at an output 206 an AC output voltage waveform 208 for driving an electroluminescent lamp 210.

The controller 202 controls the phase and polarity of the AC output voltage waveform 208 and is operable to reverse the phase and polarity of the AC output voltage waveform 208. In the present case, the controller 202 is operable to reverse the phase and polarity of the AC output voltage waveform 208 so that in a first mode of operation (Mode '1') the phase and polarity of the AC output voltage waveform 208 is reversed relative to the phase and polarity of the AC output voltage waveform 208 in a second mode of operation (Mode '2').

Figure 3:
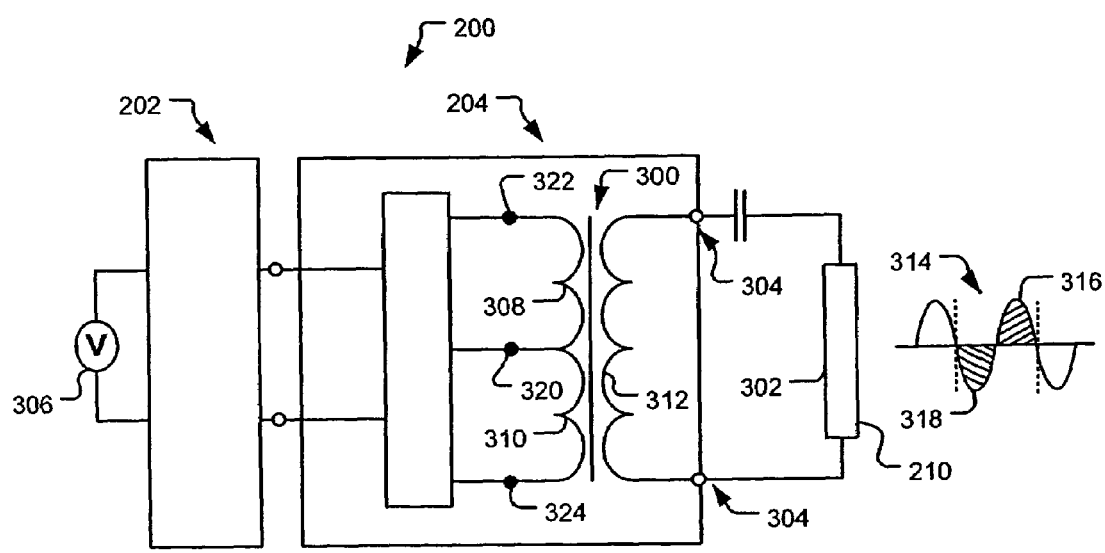
FIG. 3 is a block diagram of a driving circuit according to an embodiment of the present invention.

FIG. 3 shows a block diagram of a driving circuit 200 according to an embodiment. The driving circuit 200 shown here includes AC voltage generator 204 and controller 202. The AC voltage generator 204 shown here includes a transformer 300 for providing an AC output voltage waveform having suitable characteristics for driving an electroluminescent lamp 210 (shown here as a CCFL 302) connected to an output 304 of the driving circuit 200. However, although the following description will describe embodiments that include an AC voltage generator 204 having a transformer 300, it will be appreciated that the present invention need not be so limited. Indeed, it is envisaged that the AC output voltage generator 204 could be implemented using other than a transformer 300.

In the illustrated embodiment, an input voltage source 306 is connected to the controller 202. In an embodiment, the input voltage source may be a +12 VDC power supply.

As is shown, the transformer 300 (shown here as a centre tapped transformer) includes a first primary winding 308, a second primary winding 310, and a secondary winding 312. In the embodiment illustrated, the transformer 300 supplies, at the output 304 of the driving circuit 200, an AC output voltage waveform 314 including a positive half cycle 316 and a negative half cycle 318. In this embodiment, each half cycle 316, 318 is related to one of the primary windings 308, 310 so as to be attributable to the energisation thereof by the input voltage source 306 under the control of the controller 202.

The controller 202 is operable to control the relationship between the primary windings 308, 310 and the half cycles 316, 318 of the AC output voltage waveform 314 so that in a first mode of operation the positive half cycle 316 and the negative half cycle 318 are attributable to energisation of the first primary winding 308 and the second primary winding 310 respectively, and in a second mode of operation the positive half cycle 316 and the negative half cycle 318 are attributable to energisation of the second primary winding 310 and the first primary winding 308 respectively.

In the embodiment illustrated in FIG. 3, the relationship between the primary windings 308, 310 and the half cycles 316, 318 of the AC output voltage waveform 314 is controlled by causing the direction of a current in either the first 308 or second 310 primary windings of the transformer 300 to be reversed. Such a reversal may result from periodically switching the mode of the controller 202 from the first mode of operation to the second mode of operation. By way of example, the reversal may entail alternately coupling the input voltage source 306 to the primary windings 308, 310 so that the current in the first primary winding 308 and the second primary winding 310 alternately flows from node 320 to node 322, and node 320 to node 324 in the first mode of operation, whereas, during a second period (and after operation of the controller 202 to switch the mode of operation to the second mode of operation) the alternate coupling of the input voltage source 306 to the primary windings 308, 310 may result in the current in the first primary winding 308 and the second primary winding 310 alternately flowing from node 322 to node 320 and node 324 to node 320. As will be appreciated, as the direction of the current in the primary windings 308, 310 is reversed, the polarity (and thus the phase) of the half cycle of the output voltage waveform 314 attributable to the energisation of that winding is also reversed. As a result, the polarity and phase of the output voltage waveform 314 across the output 304 (and thus polarity and phase of the voltage waveform across the CCFL 302) will be reversed periodically as a result of the periodic reversing of the direction of the current flowing in the primary windings 308, 310.

Figure 4:
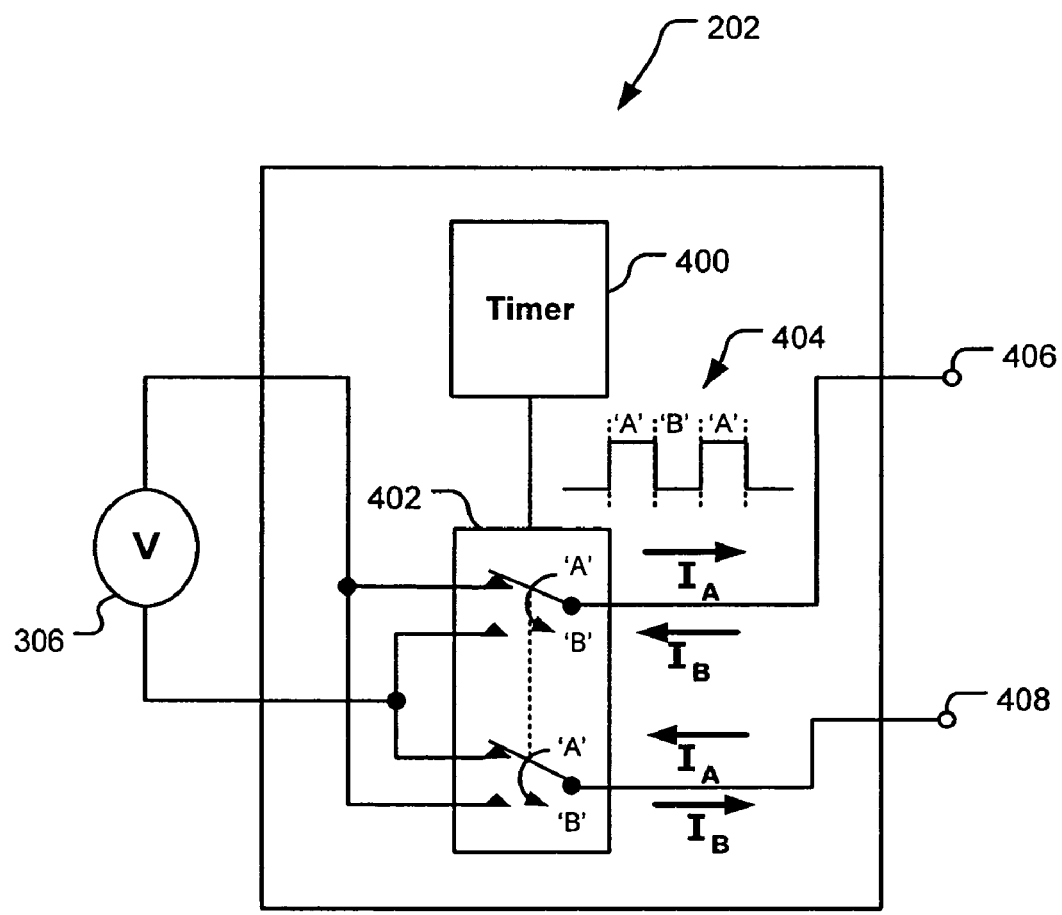
FIG. 4 is a schematic diagram of an embodiment of a controller suitable for use with a driving circuit according to the present invention.

An embodiment of a controller 202 that supports periodic switching of the controller's 202 mode of operation is depicted in FIG. 4. The illustrated controller 204 includes a timer module 400 and a switching module 402. The timer module 400 and the switching module 402 may have any suitable configuration. In the illustrated configuration, the timer module 400 provides a clock signal 404 to the switching module 402. The switching module 402 shown here is responsive to the clock signal 404 so that when the clock signal 404 is "high" ('A') the switching module 402 provides a first conducting path ($I_A$) between the input voltage source 306 and outputs 406, 408 of the controller 202 when a load is placed across those outputs 406, 408. On the other hand, when the clock signal 404 is "low" ('B') the switching module 402 provides a second conducting path ($I_B$) between the input voltage source 306 and outputs 406, 408 of the controller 202 when a load is placed across those outputs 406, 408.

Figure 5:
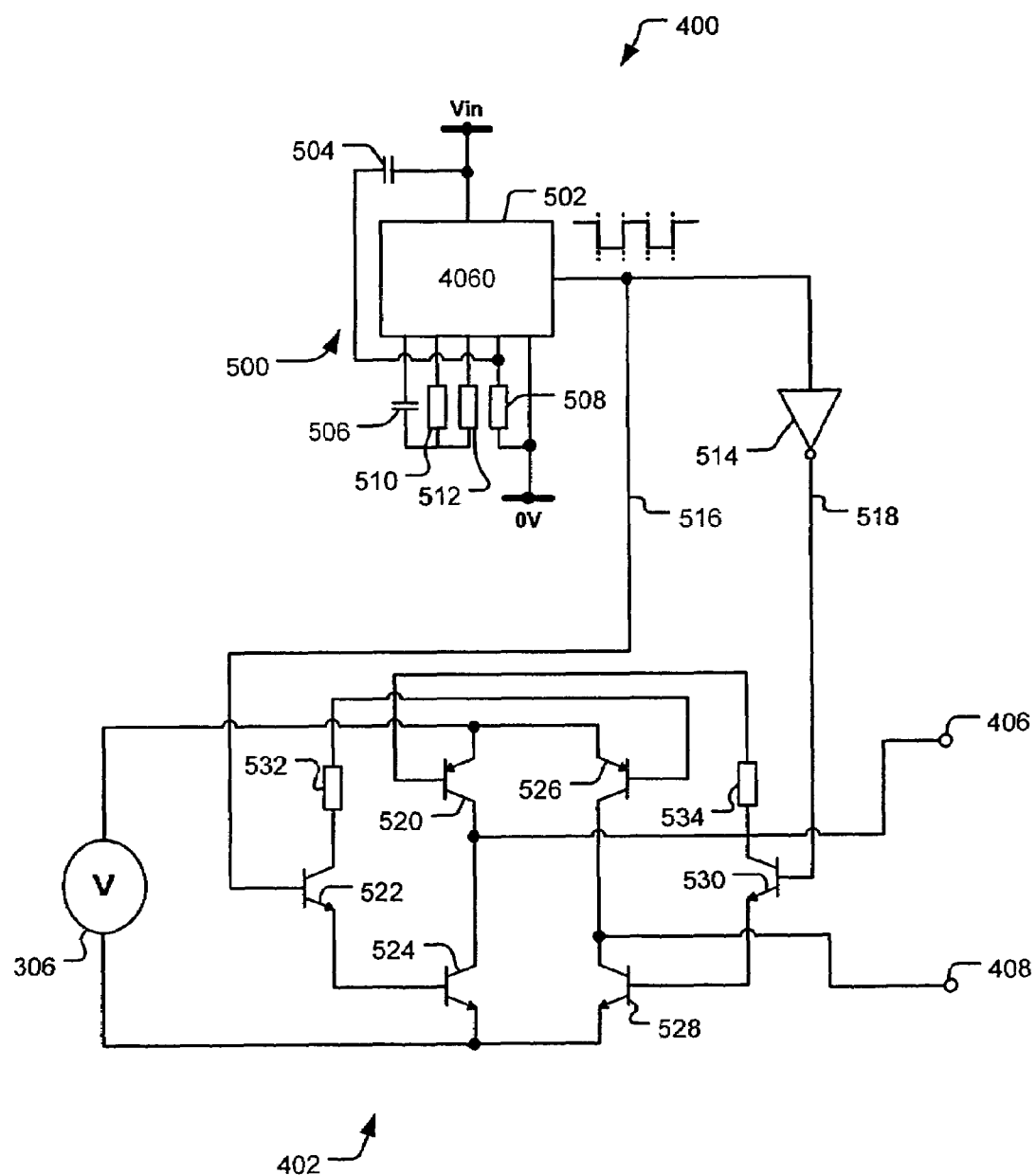
FIG. 5 shows a timer module and a switching module for use with an embodiment of the controller shown in FIG. 4.

A circuit diagram of an embodiment of a timer module 400 and switching module 402 is depicted in FIG. 5.

The timer module 400 shown in FIG. 5 includes a conventional clock generator 500 (shown here as integrated circuit 502) arranged with capacitors 504, 506, resistors 508, 510, 512 and inverter 514. The clock generator 500 is configured to provide a clock signal 516 and an inverted clock signal 518. In the illustrated arrangement, the clock signal 516, alternately provides a logical "high" state for a first duration, and a logical "low" state for a second duration. In the present case, the first and second duration are set by the value of the capacitor 506 and the resistor 510 and thus have values that are fixed by these components. However, it is to be understood that the durations need not be fixed. Indeed, in some embodiments the durations may be varied controllably.

The switching module 402 shown in FIG. 5 includes transistors 520, 522, 524, 526, 528, 530, resistors 532, 534 and outputs 406, 408.

The transistors 520, 522, 524, 526, 528, 530 are arranged to provide alternative conducting paths in response to the state of the clock signals 516, 518. In this respect, when the clock signal 516 assumes a "high" state, transistors 522, 524 and 526 provide a conducting path that results in the input voltage source 306 effectively being applied across node 406 and 408 so that node 408 approximates the input voltage source level and node 406 is grounded. On the other hand, when the clock signal 516 assumes a "low" state, transistors 520, 528 and 530 provide a conducting path that results in input voltage source 306 effectively being applied across node 408 and 406 so that node 406 approximates the input voltage source level and node 408 is grounded.

Figure 6:
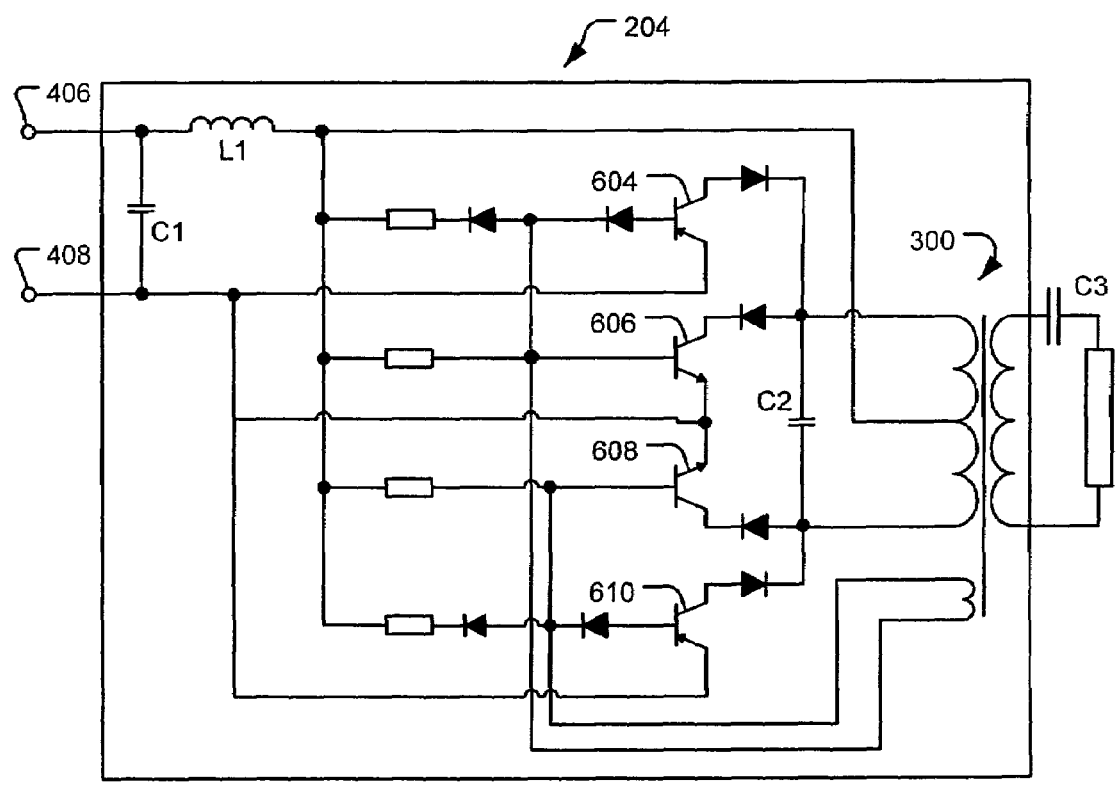
FIG. 6 shows a schematic diagram of AC voltage generator suitable for use with the embodiment of the driving circuit shown in FIG. 3.

An embodiment of an AC voltage generator 204 is illustrated in FIG. 6 (shown here as including transformer 300). In the illustrated embodiment, the AC voltage generator 204 includes dual self resonating circuits that are responsive to the state of nodes 406 and 408. The first self resonating circuit includes transistors 604 and 610. The second self resonating circuit includes transistors 606 and 608. In the present case, each of the self resonating circuits are conventional Royer type oscillators having a switching frequency of about 50 KHz. The operation of Royer type oscillators would be well understood to a person skilled in the art and so will not be described in detail for the purposes of this specification.

In terms of the components illustrated in FIG. 6, inductor L1 isolates high frequency oscillations of the AC voltage generator from nodes 406, 406. In the illustrated embodiment, L1 has a value of 200 uH.

Capacitor C1 is a filtering capacitor added across the nodes 406, 406 to stabilise the DC input into the AC voltage generator 204 and to eliminate, or reduce, ripple voltages caused, for example, when excessive loads are applied to the AC voltage generator 304. Since the polarities at nodes 406, 408 can be interchanged, C1 is an AC capacitor. In the illustrated embodiment, C1 has a value of 100 uF/50V.

Capacitor C2 is an oscillating capacitor that controls the switching frequency of the circuit. The higher the value of capacitance of C2, the lower the switching frequency and vice versa. In the illustrated embodiment, C2 has a value of 0.047 uF/250V.

C3 is an output limiting capacitor used to control the output current of the AC voltage generator 304. The higher the capacitance of C3, the larger the output current and vice versa. Because the AC output voltage waveform generated by the AC voltage generator is a high voltage waveform, C3 must have a suitable voltage rating. For example, for a CCFL requiring a starting voltage of 1550 Vrms, C3 will typically have a voltage rating of 3 KV. In the illustrated embodiment, C3 has a value of 33 pF/3 KV.

Figure 6A:
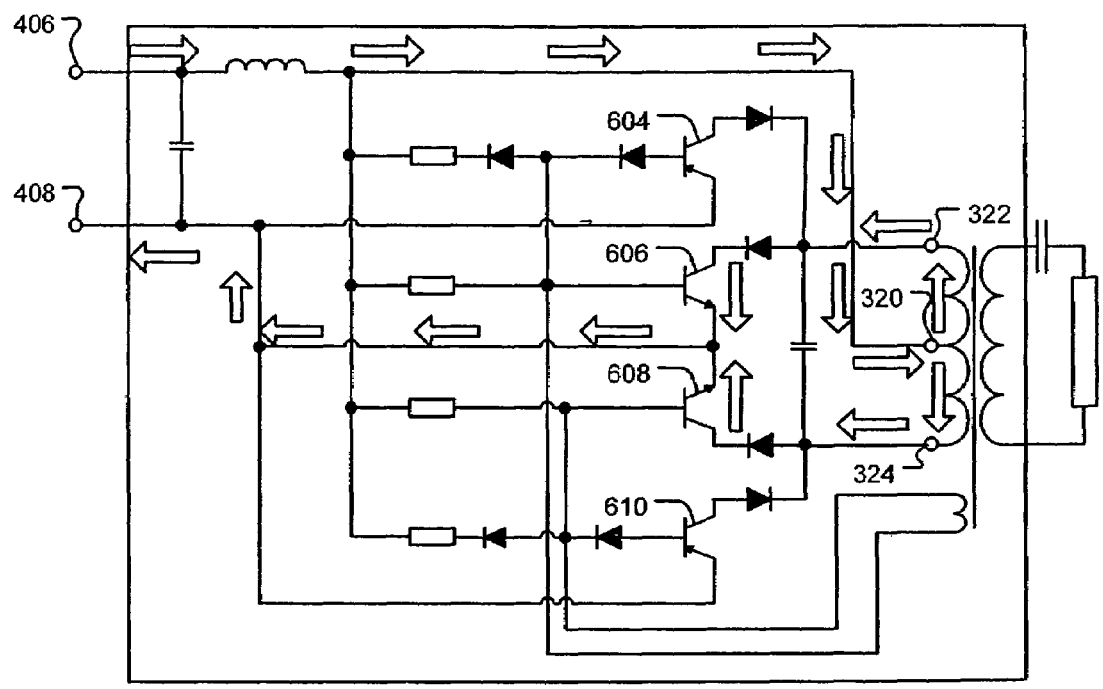
FIG. 6A shows the schematic diagram of FIG. 6 with a conducting path indicated for a first mode of operation.
Figure 6B:
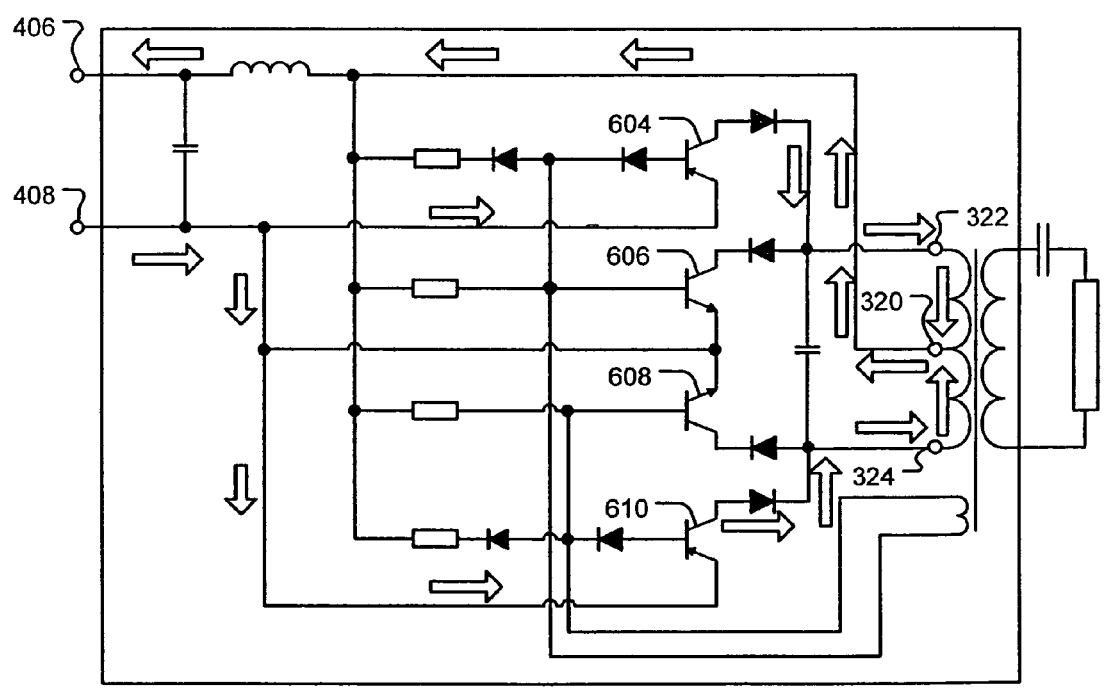
FIG. 6B shows the schematic diagram of FIG. 6 with a conducting path indicated for a second mode of operation.

Essentially, and as can be seen from FIG. 6, if node 406 is positive relative to node 408, then transistors 606 and 608 alternately conduct whereas transistors 604 and 610 do not conduct. In this mode of operation, and as is shown in FIG. 6A, current alternately flows from node 320 to node 322 and node 324. However, and as is shown in FIG. 6B, when node 408 is positive relative to node 406, transistors 606 and 608 do not conduct, whereas transistors 604 and 610 conduct. In this mode of operation, current alternately flows from nodes 322 and 324 to node 320.

In the embodiment illustrated, as the relative polarity of nodes 406 and 408 reverses under the control of the controller 202, the polarity, and thus the phase, of the AC output voltage waveform across the CCFL also reverses. Advantageously, as the polarity (and phase) of the AC output voltage waveform reverses in very short time, switching of the CCFL is not observable.

Although the above described embodiment includes a controller 202 that provides periodic mode switching of the controller 202 at a regular (or programmable) time intervals, it is not essential that every embodiment provides such a capability. Indeed, because blackening at one end of a CCFL usually becomes apparent after about several hundred hours of operation, reversing the polarity, and phase, of the AC output voltage waveform across the CCFL each time when the CCFL is switched on may also address this problem.

Figure 7:
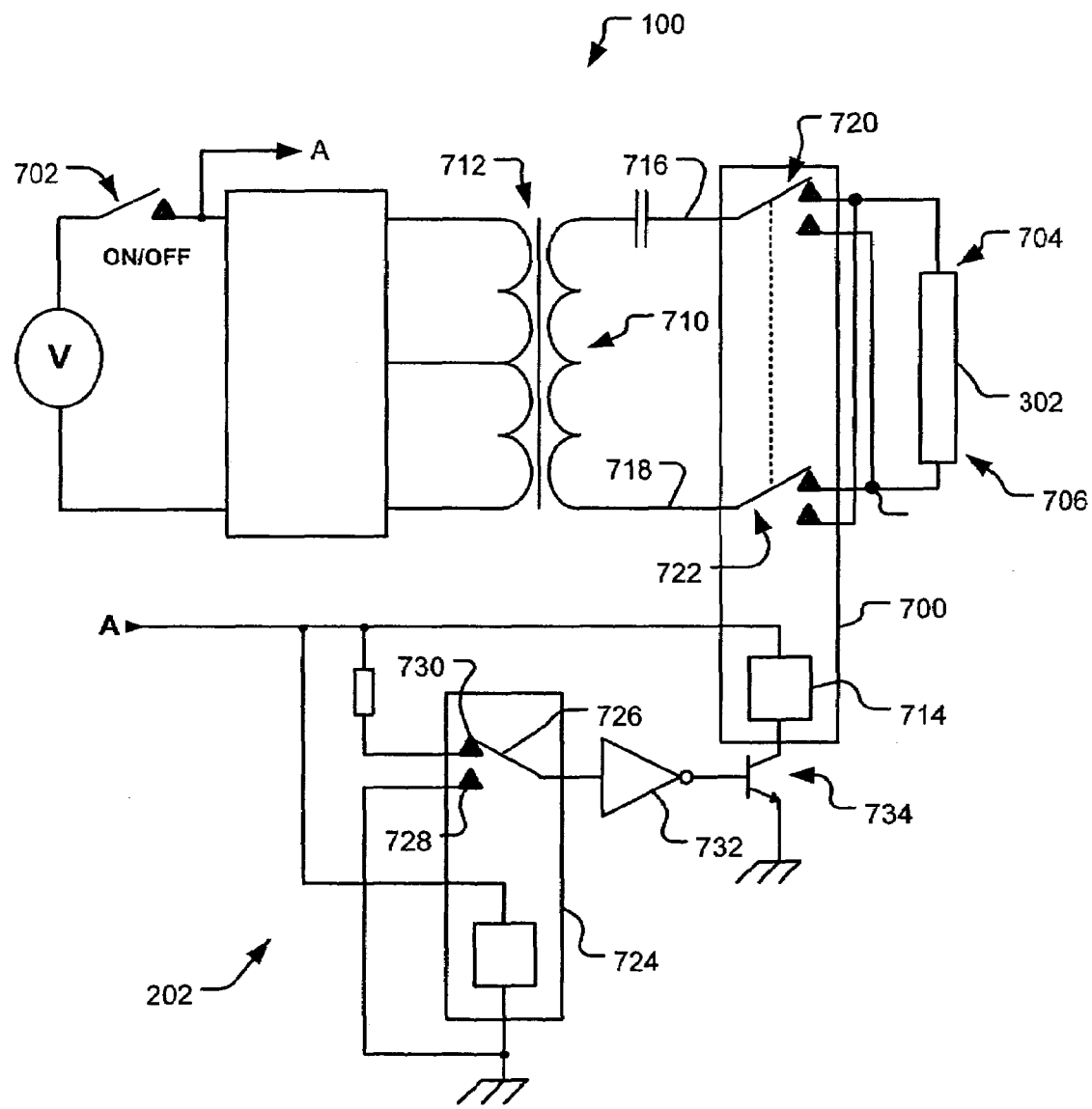
FIG. 7 shows a driving circuit according to another embodiment of the present invention.

One embodiment of a driving circuit 100 that reverses the polarity, and phase, of the AC output voltage waveform across the CCFL 302 when the CCFL 302 is switched on is shown in FIG. 7. In this embodiment, the secondary side circuit is configured as illustrated, whereas the primary side circuit is conventional.

According to the illustrated embodiment, each time the driving circuit 100 (or a device using the CCFL) is switched on, the secondary side circuit is switched once by relay 700. In the present case, the driving circuit 100 is switched "on" or "off" using on/off switch 702.

In use, each time the driving circuit 100 is switched "on" by switching the on/off switch 702 to the "on" position (that is, when the switch 702 is closed), the connection of the ends 704, 706 of the CCFL 302 across the secondary winding 710 of the transformer 712 is reversed. In the present case, the reversal of the connection between the ends 704, 706 of the CCFL 210 and the secondary winding 710 of the transformer 712 is accomplished using a relay 700 that is responsive to energisation of it's coil 714 so that when the coil 714 is energised circuit branch 716 is connected to end 706 via relay switch 720 and circuit branch 718 is connected to end 704 via relay switch 722. On the other hand, when the coil 714 is not energised, the connection between the ends 704, 706 and the circuit braches 716, 718 is reversed so circuit branch 716 is connected to end 704 via relay switch 720 and circuit branch 718 is connected to end 706 via relay switch 722.

In the embodiment illustrated, relay 724 is a bistable relay that is responsive to the on/off switch 702 so that relay switch 726 toggles between contacts 728 and 730 whenever the on/off switch 702 is switched to the "on" position.

In the illustrated arrangement, the position of the relay switch 726 determines whether an input of an inverter 732 is "high" (that is, connected to about +V) or "low" (that is, connected to about 0V).

When the input of the inverter 732 is "high", transistor 734 will be "switched off" and so the coil 714 of relay 700 will not be energised. In such a condition the relay switches 720, 722 are positioned so as to connect ends 704 and 706 to circuit branches 716 and 718 respectively. On the other hand, when the input of the inverter 732 is "low", transistor 734 will be "switched on" and so the coil 714 of relay 700 will be energised. In such a condition, the ends 704 and 706 are connected to circuit branches 718 and 716 respectively.

From the above description, and in relation to the embodiment illustrated in FIG. 7, it will be appreciated that the energisation of the coil 714 is dependent upon the position of relay switch 726. As a result, the position of the relay switches 720, 722 are also dependent upon the position of relay switch 726. Thus, the reversal of the connection between the ends 704, 706 of the CCFL 302 and the secondary winding 710 of the transformer 712 is controlled by the bistable relay 724 which in turn is controlled by consecutive switching of the on/off switch 702 to the "on" position. As a result of the afore-described configuration, each time the on/off switch 702 is switched "on", the resultant reversal in the connection of the ends 704, 706 of the CCFL 302 across the secondary winding 710 of the transformer 712 causes the polarity and phase of output voltage waveform across the two ends of the CCFL 302 to be reversed.

Figure 8:
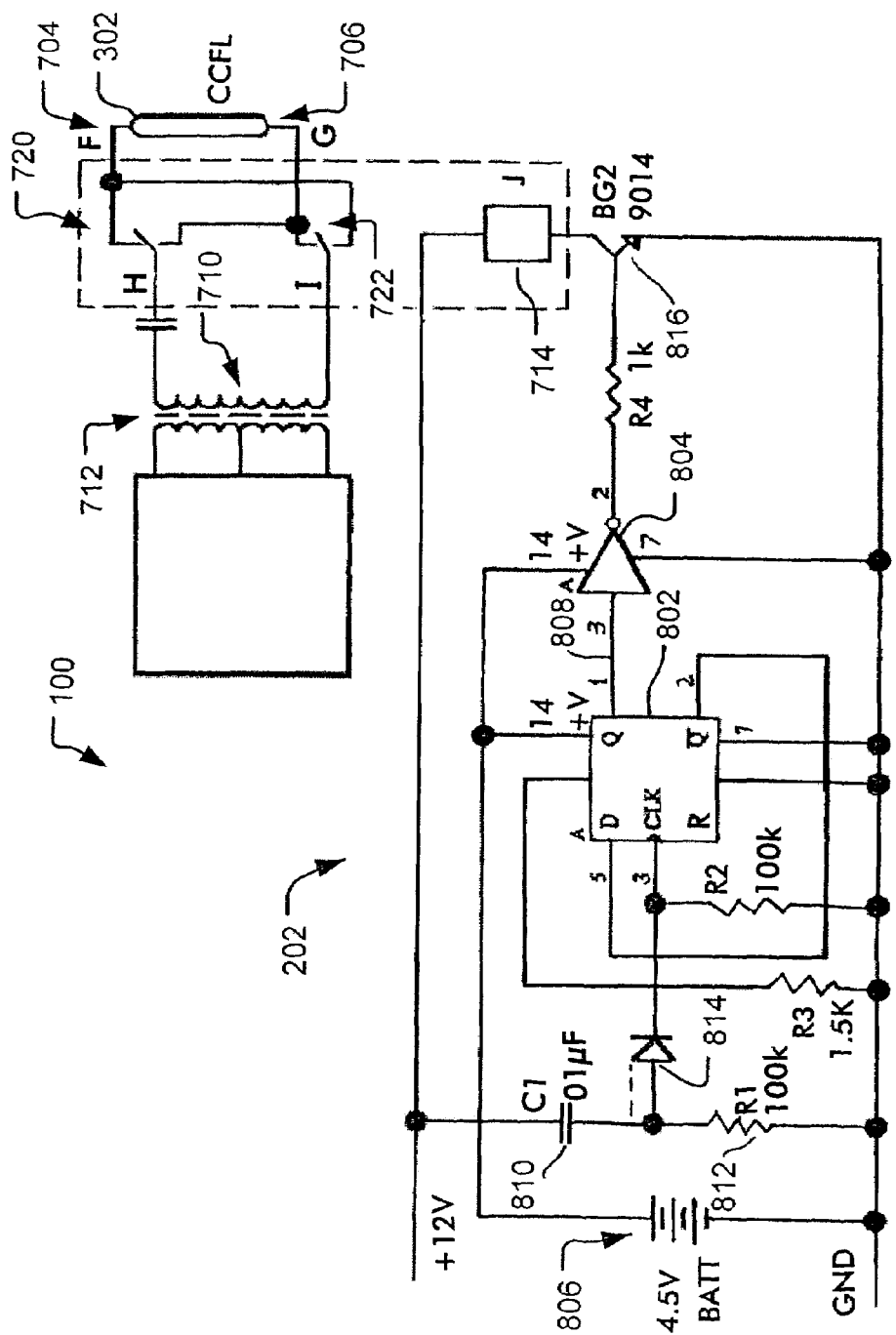
FIG. 8 shows a driving circuit according to another embodiment of the present invention.

Another embodiment of a driving circuit 100 that reverses the polarity, and phase, of an AC output voltage waveform across the CCFL 302 each time the CCFL 302 is turned on is shown in FIG. 8. In this embodiment, logic devices 802 and 804 receive continuous power from battery 806. According to this embodiment, whenever DC power (shown here as +12 VDC) is provided to the controller 202, a clock signal is provided to logic device 802 (shown here as a Q type Flip-Flop), via the combination of capacitor 810, resistor 812 and diode 814, that causes the output 808 of that device to toggle states. As will be appreciated, whenever the output 808 of logic device 802 is "high", transistor 816 is "switched off". Whereas, whenever the output 808 of logic device 802 is low, the transistor 816 is "switched on". As was the case with the embodiment described with reference to FIG. 7, coil 714 is energised whenever transistor 816 is "switched on" and not energised whenever transistor 816 is "switched off". Likewise, the position of the relay switches 720, 722 will depend upon the coil 714 so that the connection of the ends 704, 706 to the secondary winding 710 of the transformer 712 varies according to whether the coil 714 is energised or not energised.

The embodiment described with reference to FIG. 8 is exemplary. It will be appreciated that other embodiments of a driving circuit 100 need not generate a clock signal in response to the provision of power to the controller 202. Indeed, other embodiments of the present invention may simply use a manually activated switching mechanism to reverse the connection of the ends 704, 706 of the CCFL 302 across the output 206 of the AC voltage generator 204 to thereby cause the polarity and phase of output voltage waveform across the two ends of the CCFL to also reverse. Alternatively, a clock signal may be generated periodically, for example using a timer.

It is envisaged that embodiments of the present invention will be suitable for use with CCFL's having different lengths. Accordingly, it is expected that the present invention will find application in a wide range of devices and equipment that use CCFL's, for example, photocopiers, facsimile machines, flat panel displays and the like. In addition, since the problem of blackening at one end of a CCFL tube is generally more significant in long CCFL (for example, CCFL having a length of greater than about one meter) of longer length, the effect of improvement by using the invention is expected to be more significant in CCFL of longer length.

It will be appreciated the above-described embodiments are exemplary only. It will also be appreciated by those skilled in the art that although the preceding detailed description made reference to preferred embodiments and methods of use, the present invention is not intended to be limited to these preferred embodiments and method of use. Rather, the present invention is of broad scope and is intended to be limited only as set forth in the accompanying claims.

The invention claim is:

1. A driving circuit for driving an electroluminescent lamp, the driving circuit including:
    an alternating current (AC) voltage generator for providing at an output an AC output voltage waveform for driving the electroluminescent lamp; and
    a controller controlling a phase and a polarity of the AC output voltage waveform; and
    wherein the controller is operable to reverse the phase and polarity of the AC output voltage waveform.

2. A driving circuit according to claim 1, wherein the controller is operated at intervals to reverse the phase and polarity of the AC output voltage waveform.

3. A driving circuit according to claim 2, wherein the interval is a fixed interval.

4. A driving circuit according to claim 2, wherein the interval is controllably variable.

5. A driving circuit according to claim 1, wherein the controller is operated on consecutive ignition phases of the electroluminescent lamp to reverse the phase and polarity of the AC output voltage waveform.

6. A driving circuit for driving an electroluminescent lamp, including:
    an alternating current (AC) voltage generator for providing at an output of the driving circuit an AC output voltage waveform for driving the electroluminescent lamp; and
    a controller controlling a phase and a polarity of the AC output voltage waveform, the controller having two modes of operation such that in a first mode of operation the phase and polarity of the AC output voltage waveform is reversed relative to the phase and polarity of the AC output voltage waveform in a second mode of operation.

7. A driving circuit according to claim 6, wherein the mode of operation of the controller is changed at intervals, whether at a fixed interval or an interval that is controllably variable.

8. A driving circuit according to claim 6, wherein the mode of operation of the controller is changed on consecutive ignition phases of the electroluminescent lamp.

9. A driving circuit according to claim 6 wherein the AC voltage generator includes a transformer having first and second primary windings and a secondary winding and wherein the AC output voltage waveform includes positive half cycles and negative half cycles, the positive half cycles and negative half cycles having a relationship with the primary windings of the transformer so as to be attributable to energisation thereof by an input voltage source so that in the first mode of operation the positive and the negative half cycles are attributable to energisation of the first and the second primary winding respectively, and in the second mode of operation the positive and the negative half cycles are attributable to the energisation of the second and the first primary winding respectively.

10. A driving circuit according to claim 9, wherein the driving circuit has an on-state in which either of the primary windings are energised and an off-state in which neither of the primary windings are energised, and wherein for consecutive on-states the controller is operated to reverse the relationship between the primary windings and the half cycles.

11. A driving circuit for driving a cold cathode fluorescent lamp, including:
- an input for coupling to an input voltage source;
- an alternating current (AC) voltage generator including a transformer having first and second primary windings and a secondary winding, the transformer producing, at an output of the driving circuit, an AC output voltage waveform including positive half cycles and negative half cycles, the positive half cycles and negative half cycles having a relationship with the primary windings of the transformer so as to be attributable to energisation thereof by the input voltage source; and
- a controller controlling the relationship between the primary windings and the half cycles of the AC output voltage waveform so that in a first mode of operation the positive and the negative half cycles are attributable to energisation of the first and the second primary winding respectively, and in a second mode of operation the positive and the negative half cycles are attributable to the energisation of the second and the first primary winding respectively so that in the first mode of operation the phase and polarity of the AC output voltage waveform is reversed relative to the phase and polarity of the AC output voltage waveform in the second mode of operation.

12. A lighting system, including:
- a driving circuit for driving an electroluminescent lamp, including:
- an alternating current (AC) voltage generator for providing at an output an AC output voltage waveform for driving an electroluminescent lamp; and
- a controller for controlling a phase and a polarity of the AC output voltage waveform; and
- an electroluminescent lamp coupled to the output of the driving circuit;
- wherein the controller is operable to reverse the phase and polarity of the AC output voltage waveform.

* * * * *